United States Patent [19]

Inaba et al.

[11] Patent Number: 5,088,584
[45] Date of Patent: Feb. 18, 1992

[54] PULL TYPE CLUTCH COVER ASSEMBLY

[75] Inventors: Masakazu Inaba; Mitsuhiko Takenaka; Hiroshi Takeuchi, all of Neyagawa, Japan

[73] Assignee: Kabushiki Kaisha Daiken Seisakusho, Osaka, Japan

[21] Appl. No.: 474,030
[22] PCT Filed: Aug. 23, 1989
[86] PCT No.: PCT/JP89/00865
    § 371 Date: Apr. 17, 1990
    § 102(e) Date: Apr. 17, 1990
[87] PCT Pub. No.: WO90/02887
    PCT Pub. Date: Mar. 22, 1990

[30] Foreign Application Priority Data

Sep. 2, 1988 [JP] Japan .......................... 63-116299[U]
Sep. 5, 1988 [JP] Japan .......................... 63-116526[U]

[51] Int. Cl.$^5$ ................................................ F16D 13/44
[52] U.S. Cl. ................................. 192/89 B; 192/70.27
[58] Field of Search ............... 192/70.27, 89 B, 109 A

[56] References Cited

U.S. PATENT DOCUMENTS

| 3,167,162 | 1/1965 | Cook | 192/89 B |
| 4,602,708 | 7/1986 | Nagano | 192/70.27 |
| 4,646,901 | 3/1987 | Lassiaz et al. | 192/89 B |
| 4,648,499 | 3/1987 | Despres et al. | 192/89 B |
| 4,949,829 | 8/1990 | Tojima et al. | 192/89 B |

Primary Examiner—Allan D. Herrmann
Assistant Examiner—Nicholas Whitelaw
Attorney, Agent, or Firm—Armstrong, Nikaido, Marmelstein, Kubovcik & Murray

[57] ABSTRACT

In a pull type clutch cover assembly, a disc-like annular conned disc spring 8 is installed in such a manner that an inner peripheral edge of the conned disc spring is moved together with the diaphragm spring 5 toward a pressure plate side in axial direction, when the clutch is engaged, so as to urge the diaphragm spring in an axial direction opposite to the pressure plate. Therefore, an excessive increase in a load of the diaphragm spring 5 can be controlled during operation of clutch.

11 Claims, 4 Drawing Sheets

PULL TYPE CLUTCH COVER ASSEMBLY

DESCRIPTION

1. Technical field

This invention relates to a pull type clutch cover assembly, in which an outside fulcrum point of a diaphragm spring is supported by a clutch cover, an intermediate fulcrum point is made contact with a fulcrum land of a pressure plate, an inside fulcrum point is carried by a release bearing, and a clutch is disengaged by moving the release bearing toward axial rear side opposite to the pressure plate.

2. Background art

Figure 20:
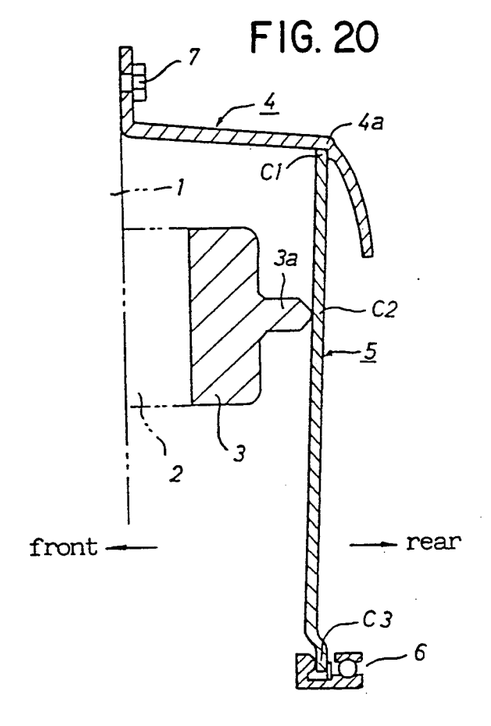
FIG. 20 is a vertical sectional partial view showing a conventional pull type clutch cover assembly.

FIG. 20 is a vertical sectional partial schematic view showing a conventionally generally known pull type clutch cover assembly. A friction facing 2 is provided on an outer periphery of a clutch disc (not shown) so that the facing 2 is pressed on a flywheel 1 by a pressure plate 3. Outer periphery and backside surfaces of the pressure plate 3 are covered by a clutch cover 4. The clutch cover 4 is secured by a bolt 7 to the flywheel at its outer periphery. An outer peripheral part of the pressure plate 3 is connected to an inside surface of the clutch cover 4 by a strap plate (not shown) extending in circumferential direction, and the pressure plate 3 is so supported that it cannot rotate relatively to the clutch cover 4 but can slide in axial direction.

A disc-like annular diaphragm spring 5 is disposed between the clutch cover 4 and the pressure plate 3. An outside fulcrum point C1 of the diaphragm spring 5 is supported by a corner 4a of the clutch cover 4, its intermediate fulcrum point C2 is made contact with a fulcrum land 3a of the pressure plate 3, and its inside fulcrum point C3 is carried by a release bearing 6.

The clutch is engaged when the facing 2 is pressed on the flywheel 1 by the pressure plate 3 which is urged by the diaphragm spring 5, and the clutch is disengaged when the release bearing 6 is moved toward axis rear side opposite to the pressure plate 3 to cause an inner peripheral part of the diaphragm spring 5 to move backward around the outside fulcrum point C1 and the pressure plate 3 to move backward by an elastic force of the strap plate.

Figure 3:
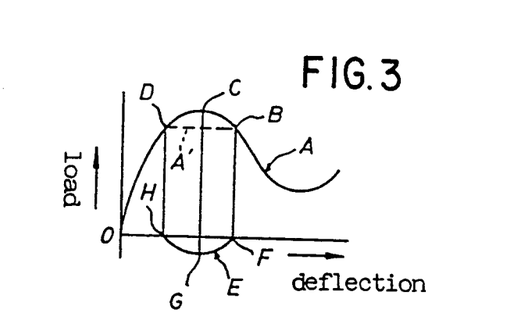
FIG. 3 is a diagram showing deflection/load characteristics of the diaphragm spring and the coned disc spring.

Generally, the diaphragm spring 5 has such a characteristic that its load changes as shown by a solid line A of FIG. 3 in relation to its deflection. A deflection in early operating stage under clutch engaged condition is ordinarily set to a value of a point B. However, the load gradually increases to reach a point C when the facing 2 is worn out after a long term of operation and the deflection of the diaphragm spring 5 under clutch engaged condition decreases as the result. Then, the load gradually decreases to cause the deflection to reach a wear limit point D when the wear of the facing 2 further increases. As described above, the conventional structure has included such a trouble that the load (pressing force of the diaphragm spring 5 might increase more than required so that an excessive torque might be transmitted between the drive side flywheel 1 and the driven side clutch disc (not shown) and a necessary treading force of clutch pedal might increase.

DISCLOSURE OF THE INVENTION

In order to solve the above problem; in a pull type clutch in which an outside fulcrum point of a diaphragm spring is supported by a clutch cover, an intermediate fulcrum point is made contact with a fulcrum land of a pressure pate, an inside fulcrum point is carried by a release bearing, and a clutch is disengaged by moving the release bearing toward axial rear side opposite to the pressure plate; this invention provides a pull type clutch cover assembly, in which a disc-like annular coned disc spring is disposed between the diaphragm spring and the clutch cover or the pressure plate, in such a manner that an inner peripheral edge of the coned disc spring is moved together with the diaphragm spring toward the pressure plate side in axial direction, when the clutch is engaged, so as to urge the diaphragm spring in an axial direction opposite to the pressure plate.

According to this invention, when a deflection of the diaphragm spring decreases due to a wear of a friction facing at time of clutch engagement, the coned disc spring is compressed in the axial direction to urge the diaphragm spring in a direction opposite to the pressure plate. Therefore, an increase in a load of the diaphragm spring applied on the pressure plate can be minimized.

BEST MODE FOR CARRYING OUT THE INVENTION

Figure 1:
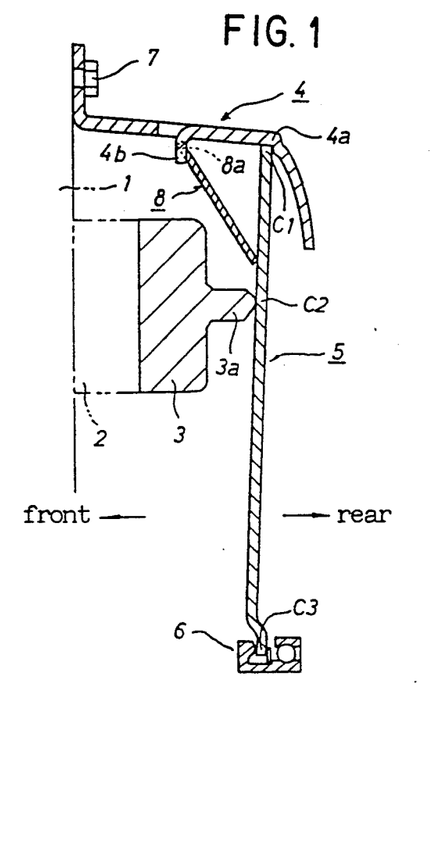
FIG. 1 is a vertical sectional partial schematic view showing a pull type clutch cover assembly according to this invention.

In FIG. 1, portions corresponding to those of FIG. 20 are attached with the same symbols. 4b is a radially inward projection provided on plural places (three places in this example) with spaces left therebetween in circumferential direction and on an inside surface of a clutch cover 4 at a pressure plate 3 side from a corner 4a, and the projection 4b is formed by punching and bending from the clutch cover 4.

Figure 2:
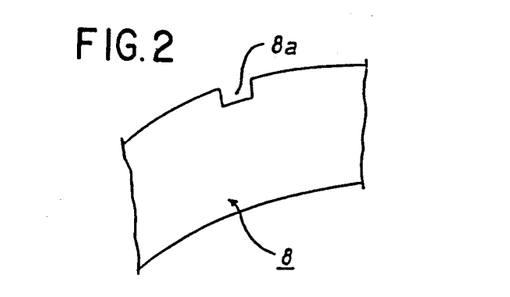
FIG. 2 is a partial view showing a coned disc spring of FIG. 1.

8 is a disc-like annular coned disc spring. The coned disc spring 8 is disposed in a space between an outside fulcrum point C1 of a diaphragm spring 5 and the projection 4b with respect to its axial direction, and between the clutch cover 4 and a fulcrum land 3a with respect to its radial direction. A notch 8a having a circumferential width same as that of the projection 4b is formed on an outer peripheral edge of the coned disc spring 8 as illustrated by FIG. 2. The coned disc spring 8 is installed in such a way that its outer peripheral edge is so held that its notch 8a is fitted onto the projection 4b from the diaphragm spring side, and its inner peripheral edge is made contact with a portion radially outer than an intermediate fulcrum point C2 of the diaphragm spring 5 from the pressure plate 3 side when the clutch is engaged. Consequently, the diaphragm spring 5 is urged in a direction opposite to the pressure plate 3 when the clutch is engaged.

The coned disc spring 8 is so set that its urging load on the diaphragm spring 5 changes according to a change in a deflection of the diaphragm spring 5 as shown by a solid line E of FIG. 3. In FIG. 3, an arrow put along an axis of abscissa indicates an increasing direction of the deflection of the diaphragm spring 5 and a decreasing direction of that of the coned disc spring 8.

In the pull type clutch cover assembly having such a structure, when the deflection of the diaphragm spring 5 decreases due to a wear of the facing 2 to cause its load to increase from a point B to a point C and decrease from the point C to a point D under the clutch engaged condition; an inner peripheral part of the diaphragm spring 5 moves toward the pressure plate 3 side around the outside fulcrum point C1, so that the coned disc spring 8 is compressed in the axial direction, the deflection of the coned disc spring 8 increases, and its load changes in a direction opposite to that of the diaphragm spring 5 (minus direction) i.e. increases from a point F to a point G and decreases from the point G to a point H. Consequently, load changes of the diaphragm spring 5 and the coned disc spring 8 offset each other and the load (pressing force) of the diaphragm spring 5 on the pressure plate 3 changes from a solid line A to a broken line A', so that the trouble due to excessive pressing force generated during clutch operation can be eliminated practically.

Under clutch disengaged condition, since the inner peripheral part of the diaphragm spring 5 moves toward a side opposite to the pressure plate 3 around the outside fulcrum point C1, an axial clearance is produced between the inner peripheral edge of the coned disc spring 8 and the diaphragm spring 5 so that the coned disc spring 8 becomes easy to rotate or vibrate in its axial direction. However, since the coned disc spring is fitted onto the projection 4b from outside at the notch 8a, the coned disc spring 8 is locked rotatably to the clutch cover 4 so that it does not rotate relatively to the clutch cover 4 and the diaphragm spring 5. Further, since the notch 8a abuts on the projection 4b with no clearance left therebetween in its circumferential direction, the both 8a and 4b do not collide against each other and abnormal sound due to rotation and axial vibration of the coned disc spring 8 is not emitted even if engine vibrations etc. are transmitted to the coned disc spring 8. Moreover, there is no chance for the both 8a and 4b to wear.

Figure 4:
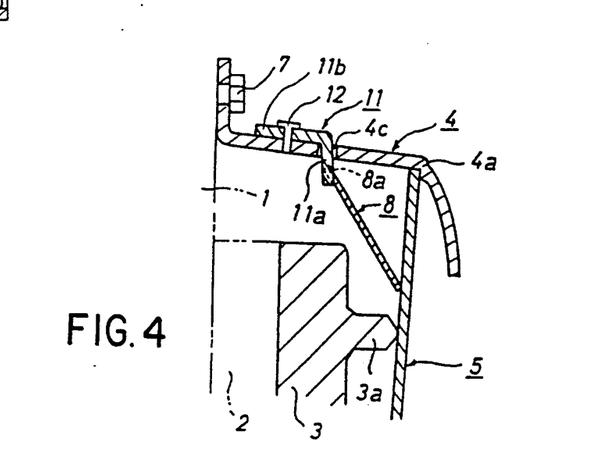
FIG. 4 is a vertical sectional partial schematic view showing an laternate structure of the embodiment of FIG. 1.

FIG. 4 shows the alternate structure of the embodiment of FIG. 1. In this embodiment, the projection holding the outer peripheral edge of the coned disc spring 8 is made of another member such as a slender rectangular plate 11, for example. In FIG. 4, portions corresponding to those of FIG. 1 are attached with the same symbols. A body 11b of the plate 11 is secured by a rivet 12 to the clutch cover 4 along its outside surface in such a way that a bent tip end 11a is passed through a hole 4c made on the clutch cover 4 and extended in radial inward direction. The body 11b has such a length that it can be secured only to a part of outside surface of the clutch cover 4 which covers an outer periphery of the pressure plate 3. Incidentally, the body 11b may be secured by welding work. The plate 11 is installed at three places, in this embodiment, with spaces left therebetween in circumferential direction. The notch 8a of the coned disc spring 8 is so formed as to have a circumferential width same with that of a tip end 11a of the plate 11, and the outer peripheral edge of the coned disc spring 8 is held in such a way that the notch 8a is fitted onto the tip end 11a from the diaphragm spring 11 side.

According to this structure, in order to form the projection for holding the outer peripheral edge of the coned disc spring 8, it may be enough to only secure the body 11b onto the outside surface of the clutch cover 4 by making the hole 4c on the clutch cover 4 and passing the tip end 11a through the hole 4c. Therefore, the foregoing projection can be formed easily as compared with the projection 4b which is formed by punching and bending from the clutch cover 4. Further, the tip end 11b can be worked easily for adjusting its circumferential width to that of the notch 8a before securing the plate 11, so that dimensional accuracy can be improved.

As described above, according to the embodiments of FIG. 1 and FIG. 4, the coned disc spring 8 is so installed as to urge the diaphragm spring 5 in the direction opposite to the pressure plate 3 at the time of clutch engagement. Therefore, the excessive increase in the diaphragm spring load during the clutch operation can be avoided and the increase in required treading force of clutch can be prevented, in the pull type clutch.

Further, since the outer peripheral edge of the coned disc spring 8 is held by fitting the notch 8a onto the projection 4b or the tip end 11a, the coned disc spring 8 can be prevented from rotating relatively to the clutch cover 4 and the diaphragm spring 5. Moreover, since the notch 8a abuts on the projection 4b or the tip end 11a with no clearance left therebetween in the circumferential direction, the emission of abnormal sound due to collision of the 8a against the 4b or 11a can be controlled and the wear of the 8a and the 4b or 11a can be avoided.

Especially in the structure of FIG. 4, since the plate 11 can be installed easily, the projection for holding the outer peripheral edge of the coned disc spring 8 can be formed easily.

Figure 5:
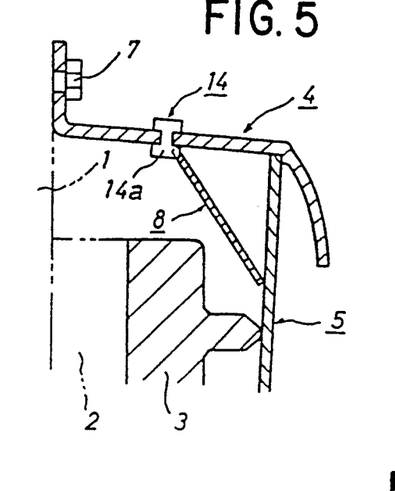
FIG. 5 is a vertical sectional partial schematic view showing another alternate structure of the embodiment of FIG. 1. is a vertical sectional partial schematic view showing further another alternate structure of the embodiment of FIG. 1. 7 is a partial view viewed in a direction of arrow VII of FIG. 6.

FIG. 5 shows another alternate structure of the embodiment of FIG. 1. In this embodiment, a rivet 14 is used in place of the plate 11 of the embodiment of FIG. 4. Namely, the rivet 14 is crimped to the clutch cover 4 so that the notch 8a of the coned disc spring 8 is fitted onto a part 14a of the rivet 14, which projects to an inside of the clutch cover 4. According to this structure, since the projection onto which the notch 8a is fitted can be formed simultaneously with the crimping of the rivet 14, the foregoing projection can be formed easily and by using simple material as compared with the embodiment of FIG. 4

Figure 6:
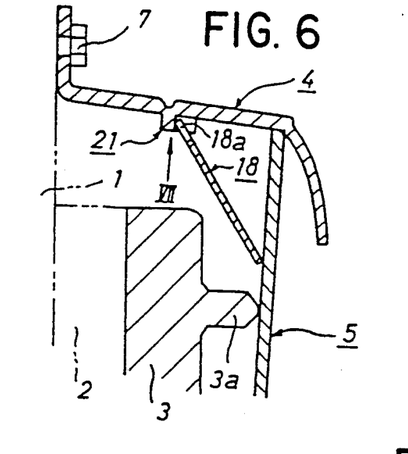
Figure 7:
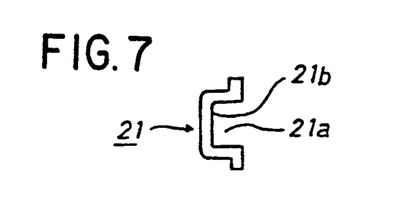
Figure 8:
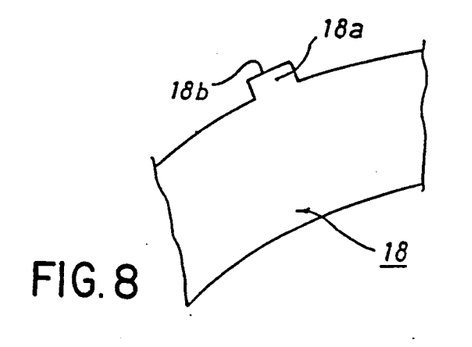
FIG. 8 is a partial view showing a conned disc spring of the embodiment of FIG. 6.
Figure 9:
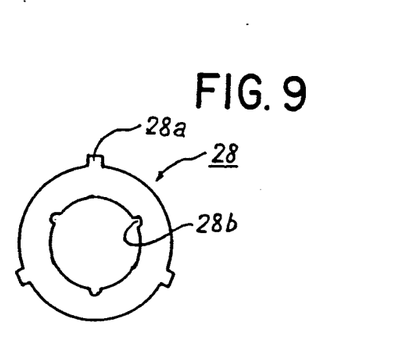
FIG. 9 and FIG. 10 are views showing another structures of the coned disc spring of the embodiment of FIG. 6.
Figure 10:
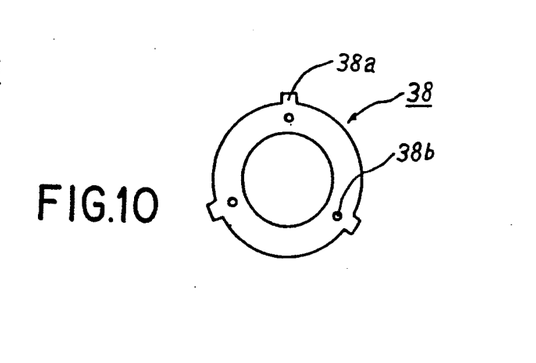

FIG. 6 shows further another alternate structure. Portions corresponding to those of FIG. 1 are attached with the same symbols. 21 is a radially inward projection provided on plural places (three places in this example) with spaces left therebetween in circumferential direction and on the inside surface of the clutch cover 4, and the projection 21 is formed by drawing from the clutch cover 4. As illustrated by FIG. 7 which is the partial view viewed in the direction of arrow VII of FIG. 6, the projection 21 extends in the circumferential direction and is formed into an U-shape projecting toward the pressure plate 3 side in the axial direction on the inside surface of the clutch cover 4. A projecting piece 18a having a circumferential width equal to that of a recessed part 21a of the projection 21 is provided on an outer peripheral edge of a coned disc spring 18 as illustrated in FIG. 8. Incidentally, the deflection/load characteristic of the coned disc spring 18 is set similarly with the the coned disc spring 8 of the embodiment of FIG. 1. The outer peripheral edge of the coned disc spring 18 is held in such a way that the projecting piece 18a is fitted in the recessed part 21a of the projection 21, i.e. a tip edge 18b of the projecting piece 18a is made contact with a bottom edge 21b of the recessed part 21a from the diaphragm spring 5 side. The same effect as that of the embodiment of FIG. 1 can also be achieved by this structure. Conned disc springs as illustrated by FIG. 9 and FIG. 10 may be used in this embodiment. Notches 28b are formed on an inner peripheral edge between projecting pieces 28a in the coned disc spring 28 shown by FIG. 9, and holes 38b are made at central parts of body where projecting pieces 38a are formed in the coned disc spring 38 shown by FIG. 10. When the coned disc springs 28 or 38 is used, the coned disc spring 28 or 38 can be rotated by inserting a bar-shaped tool etc. into the notch 28b or the hole 38b and the projection 28a or 38a can be fitted in the recessed part 21a of the projection 21, so that installation work of the coned disc spring can be carried out easily. Naturally, the coned disc springs having such the notch or hole may be used in the embodiments of FIG. 1, FIG. 4 and FIG. 5, and the similar effect can be achieved.

Figure 11:
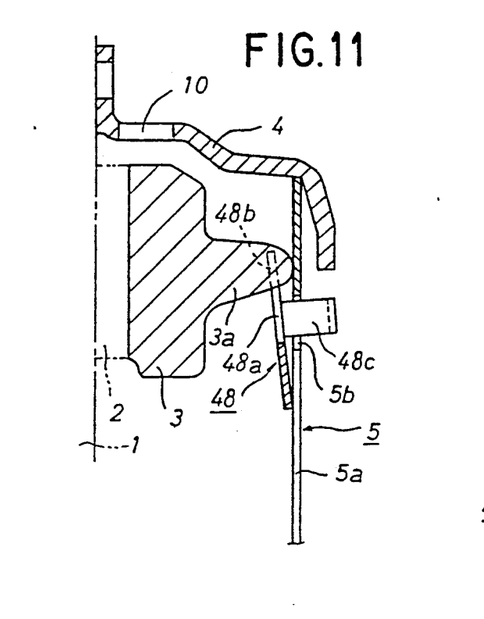
FIG. 11 is a vertical sectional partial view showing a pull type clutch cover assembly of another embodiment.
Figure 12:
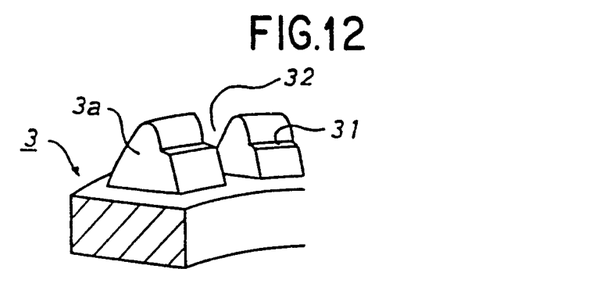
FIG. 12 is an oblique partial view showing a fulcrum land of FIG. 11.
Figures 13, 15:
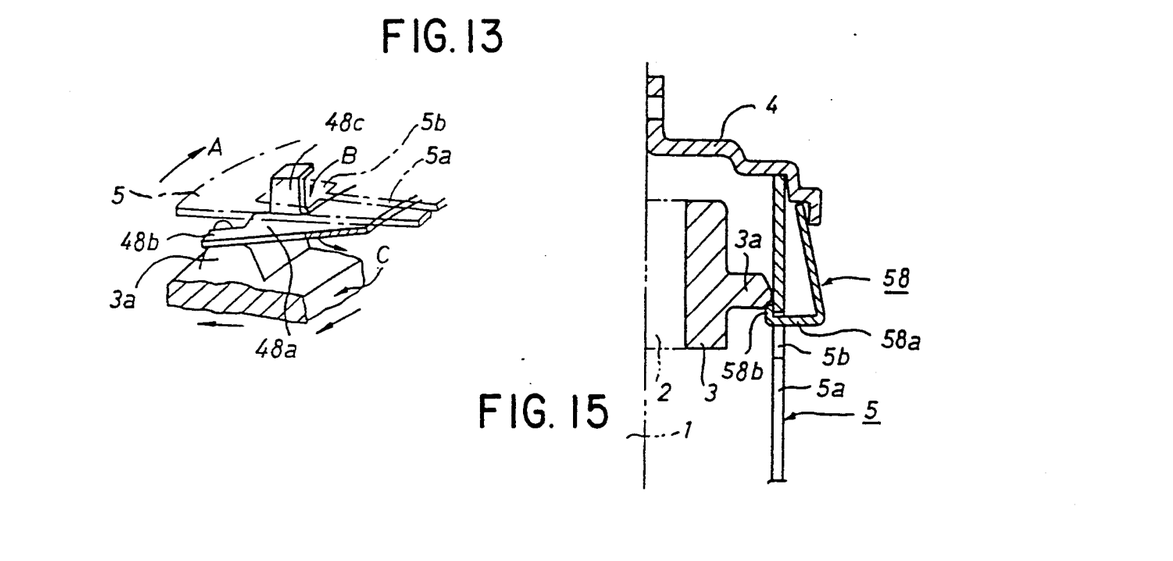
FIG. 13 is an oblique partial view showing an essential part of FIG. 11. is a partial view showing a coned disc spring of FIG. 11.
FIG. 15 is a vertical sectional partial view showing a pull type clutch cover assembly of further another embodiment.

FIG. 11 shows another embodiment. Portions corresponding to those of FIG. 20 are attached with the same symbols. As illustrated in FIG. 12, a stepped part 31 is formed on a radial inward portion of a fulcrum land 3a, and a groove 32 having a depth approximately equal to a protruding height of the fulcrum land 3a is formed from the diaphragm spring 5 side at plural places with spaces left therebetween in the circumferential direction. The groove 32 is so formed as to divide the fulcrum land 3a vertically in the radial direction. As illustrated by FIG. 13, the diaphragm spring 5 has a radial slit 5a, and an enlarged opening 5b is formed on a radial outside end of each slit 5a.

Figure 14:
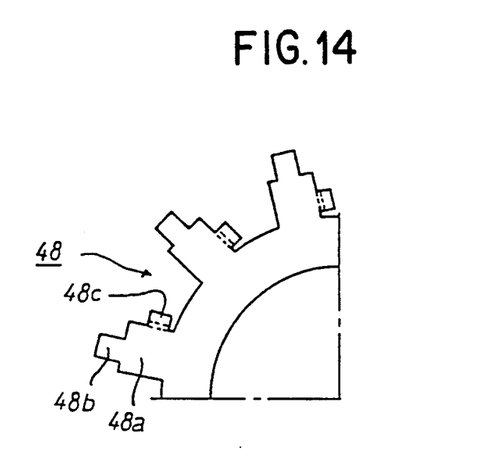

A coned disc spring 48 is disposed between the diaphragm spring 5 and the pressure plate 3. As illustrated in FIG. 13 and FIG. 14, radial outward first projecting pieces 48a are formed on plural places of outer peripheral edge of the coned disc spring 48 with spaces left therebetween in circumferential direction, i.e. on places equal to the number of the enlarged openings 5b of the diaphragm spring 5, and radial outward second projecting pieces 48b are formed on tip portions of the projecting pieces 48a. A circumferential width of the projecting piece 48b is made equal to that of the groove 32 of the fulcrum land 3a. On a side edge on clutch rotating direction (direction of arrow A of FIG. 13) side of the projecting piece 48a, there formed a third projecting piece 48c which projects to the diaphragm spring 5 side and a tip end of which is bent in the clutch rotating direction.

The coned disc spring 48 is installed in such a way that the projecting piece 48b is fitted in the groove 32 of the fulcrum land 3a, the tip end of the projecting piece 48a is made contact with the stepped part 31 of the fulcrum land 3a from the diaphragm spring 5 side, the projecting piece 48c is passes through the enlarged opening 5b of the diaphragm spring 5, and its inner peripheral edge is made contact with the diaphragm spring 5 from the pressure plate 3 side. A projecting part of the projecting piece 48c to the diaphragm spring 5 side is passed through the enlarged opening 5b at a portion opposite to the clutch rotating direction.

The coned disc spring 48 is so set that its pressing load on the diaphragm spring 5 changes according to a change in a deflection of the diaphragm spring 5 as shown by the solid line E of FIG. 3.

In the pull type clutch cover assembly having such a structure, when the deflection of the diaphragm spring 5 decreases due to the wear of the facing 2 to cause its load to increase from the point B to the point C and decrease from the point C to the point D under the clutch engaged condition; the inner peripheral part of the diaphragm spring 5 moves toward the pressure plate 3 side around the outside fulcrum point C1, so that the coned disc spring 48 is compressed in the axial direction around the tip end of the projecting piece 48a, the deflection of the coned disc spring 48 increases, and its load changes in the direction opposite to that of the diaphragm spring 5 (minus direction) i.e. increases from the point F to the point G and decreases from the point G to the point H. Consequently, the load changes of the diaphragm spring 5 and the coned disc spring 48 offset each other and the load (pressing force) of the diaphragm spring 5 on the pressure plate 3 changes from the solid line A to the broken line A', so that the trouble due to excessive pressing force generated during clutch operation can be eliminated practically.

Under clutch disengaged condition, since the inner peripheral part of the diaphragm spring 5 moves toward the side opposite to the pressure plate 3 around the outside fulcrum point C1, the axial clearance is produced between the inner peripheral edge of the coned disc spring 48 and the diaphragm spring 5 so that the coned disc spring 48 becomes easy to rotate or vibrate in its axial direction. However, since the coned disc spring 48 is fitted in the groove 32 of the fulcrum land 3a at the projecting piece 48b, the coned disc spring 48 is locked rotatably to the pressure plate 3 so that it does not rotate relatively to the pressure plate 3, the clutch cover 4 and the diaphragm spring 5. Further, since the projecting piece 48b abuts on the circumferential side walls of the groove 32 with no clearance left therebetween., the projecting piece 48b do not collide against the both side walls of the groove 32 and abnormal sound due to rotation and axial vibration of the coned disc spring 48 even if engine vibrations etc. are transmitted to the coned disc spring 48. Moreover, there is no chance for the both side walls of the projecting piece 48b and the groove 32 to wear.

The projecting piece 48c the tip end of which is bent in the clutch rotating direction is passed through the enlarged opening 5b, and the projecting part of the projecting piece 48c to the diaphragm spring 5 side is passed through the the enlarged opening 5b at the portion opposite to the clutch rotating direction, in this instance. Therefore, when coned disc spring 48 rotates together with the pressure plate 3 and the diaphragm spring 5, air flow is produced along the projecting piece 48c passing from a rear side of the diaphragm spring 5 through the enlarged opening 5b as illustrated by an arrow B of FIG. 13. The air flows so as to pass by the pressure plate 3 and the facing 2, and gets out through a hole 10 (FIG. 11) provided on an outer periphery of the clutch cover 4 as illustrated by an arrow C of FIG. 13. Consequently, the pressure plate 3 and the facing 2 are cooled by the air allowing along the projecting piece 48c through the enlarged opening 5b.

As described above, according to this embodiment, the coned disc spring 48 is so installed that the tip end of the first projecting piece 48a is made contact with stepped part 31 of the fulcrum land 3a from the diaphragm spring 5 side, and the inner peripheral edge is made contact with the diaphragm spring 5 from the pressure plate 3 side at the time of clutch engagement. Therefore, when the inner peripheral part of the diaphragm spring 5 is moved to the pressure plate 3 side under the clutch engaged condition, the diaphragm spring 5 is urged by the coned disc spring 48 to the side opposite to the pressure plate 3, so that the excessive increase in the diaphragm spring load during the clutch operation can be avoided and the increase in required treading force of clutch can be prevented in the pull type clutch.

Further, since the second projecting piece 48b of the coned disc spring 48 is fitted in the groove 32 of the fulcrum land 3a, the coned disc be prevented from rotating relatively to the pressure plate 3 and the clutch cover 4 even under the clutch disengaged condition. Moreover, since the projecting piece 48b abuts on the both circumferential side walls of the groove 32 with no clearance left therebetween, the emission of abnormal sound due to collision of the projecting piece 48b against the both side walls of the groove 32 can be controlled and the wear of them can be avoided.

Furthermore, since the third projecting piece 48c of the coned disc spring 48 is passed through the enlarged opening 5b of the diaphragm spring 5, the rotation of the coned disc spring 48 causes the air to flow along the projecting piece 48c through the enlarged opening 5b from the rear side of the diaphragm spring 5, so that the pressure plate 3 and the facing 2 can be cooled.

FIG. 15 shows further another embodiment. Portions corresponding to those of FIG. 11 are attached with the same symbols. 58 is the coned disc spring.

Figure 16:
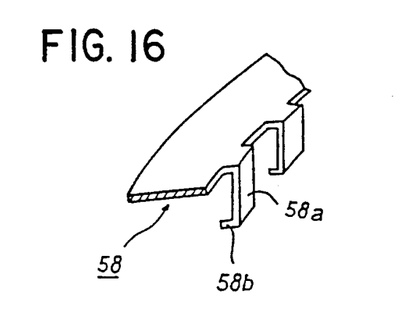
FIG. 16 is an oblique partial view showing a coned disc spring of FIG. 15.

The coned disc spring 58 is disposed between the diaphragm spring 5 and the clutch cover 4. As illustrated by FIG. 15 and FIG. 16, a projecting piece 58a projecting to the diaphragm spring 5 side and passed through the enlarged opening 5b is formed on the inner peripheral edge of the coned disc spring 58, and a tip end 58b of the projecting piece 58a is bent toward radial outward side. A circumferential width of the projecting piece 58a is made equal to that of radial outside of the enlarged opening 5b.

The coned disc spring 58 is installed in such a way that its outer peripheral edge is made contact with inside surface of the clutch cover 4 from a side opposite to the diaphragm spring 5, the projecting piece 58a is passed through the enlarged opening 5b at its radial outside portion, a diaphragm spring 5 side face of the tip end 58b is made contact with a radial outside edge of the enlarged opening 5b from the pressure plate 3 side when the clutch is engaged.

The deflection/load characteristic of the coned disc spring 58 is set similarly to that of the coned disc spring 48 of FIG. 11.

In the pull type clutch cover assembly having such a structure, when the inner peripheral part of the diaphragm spring 5 is moved to the pressure plate 3 side around the outside fulcrum point C1 due to the wear of the facing 2 under the clutch engaged condition; the projecting piece 58a of the coned disc spring 58 moves together with the diaphragm spring 5 in the axial direction toward the pressure plate 3 side and the coned disc spring 58 is brought into a compressed state in the axial direction around its outer peripheral edge, so that the coned disc spring 58 urges the diaphragm spring 5 in the direction opposite to the pressure plate 3. Accordingly, the trouble due to excessive pressing force generated during clutch operation can be eliminated practically in the same way as the embodiment of FIG. 11.

Further, since the coned disc spring 58 is installed in such the way that the projecting piece 58a is passed through the enlarged opening 5b, it is lock rotatably in relation to the diaphragm spring 5 so that it does not rotate relatively to the diaphragm spring 5 and the clutch cover 4. The clearance is produced between the diaphragm spring 5 side face of the tip end 58b of the projecting piece 58a and the radial outside edge of the enlarged opening 5b under clutch disengaged condition, so that the coned disc spring 58 becomes easy to rotate or vibrate in its circumferential and axial directions. However, since the projecting piece 58a abuts on the circumferential side edges of the enlarged opening 5b with no clearance left therebetween, the projecting piece 58a does not collide against the both side edges of the enlarged opening 5b and abnormal sound due to circumferential and axial vibrations of the coned disc spring 58 is not emitted. Furthermore, there is no chance for the projecting piece 58a and the both side edges of the enlarged opening 5b to wear.

As described above, according to this embodiment, the coned disc spring 58 is installed in such the way that its outer peripheral edge is made contact with the inside surface of the clutch cover 4 from the side opposite to the diaphragm spring 5, and the projecting piece 58a provided on the inner peripheral edge is moved together with the diaphragm spring 5 toward the pressure plate 3 side in the axial direction when the clutch is engaged. Therefore, when the inner peripheral part of the diaphragm spring 5 is moved to the pressure plate 3 side under the clutch engaged condition, the coned disc spring 58 urges the diaphragm spring 5 in the direction opposite to the pressure plate 3 in the same way as the embodiment of FIG. 11, so that the excessive increase in the diaphragm spring load during the clutch operation can be avoided and the increase in required treading force of clutch can be prevented in the pull type clutch.

Since the projecting piece 58a provided on the coned disc spring 58 is passed through the enlarged opening 5b, the coned disc spring 58 is prevented from rotating relatively to the diaphragm spring 5 and the clutch cover 4 etc. Further, since the projecting piece 58a abuts on the both circumferential side edges of the enlarged opening 5b, abnormal sound and wear caused by the collision of the projecting piece 58a against the both side edges of the enlarged opening 5b can be controlled.

Figure 17:
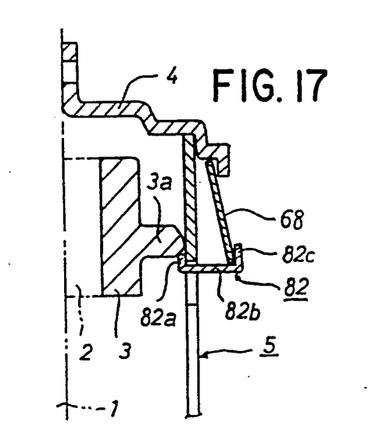
FIG. 17 is a vertical sectional partial view showing an alternate structure of the embodiment of FIG. 15.
Figure 18:
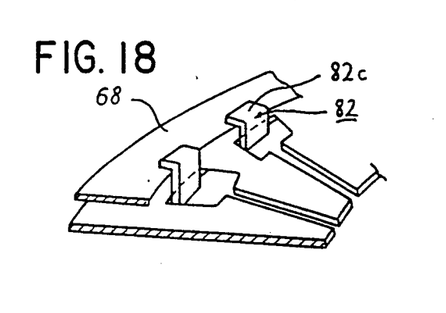
FIG. 18 is an oblique partial view showing an essential part of FIG. 17.
Figure 19:
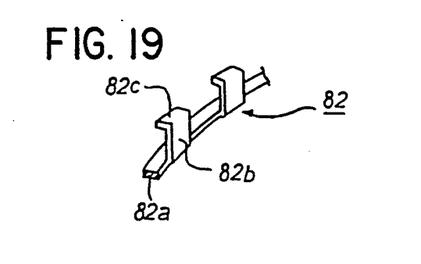
FIG. 19 is an oblique partial view showing a disc-like annular body of FIG. 17.

The projecting piece 58a passed through the enlarged opening 5b is formed integrally with the coned disc spring 58 in the embodiment of FIG. 15, however, this may be formed separately from the spring 58. FIG. 17 shows this embodiment and FIG. 18 shows its essential part. 68 is a coned disc spring, and 82 is a disc-like annular body having a projecting piece 82b provided separately from the coned disc spring 68. The disc-like annular body 82 is so installed that a ring-shaped body 82a is made contact with the radial outside edge of the enlarged opening 5b from the pressure plate 3 side at the time of clutch engagement. The projecting piece 82b projecting through a radial outside portion of the enlarged opening 5b is formed on an inner peripheral edge of the body 82a as illustrated by FIG. 19. A circumferential width of the projecting piece 82b is made equal to that of radial outside of the enlarged opening 5b. A tip end 82c of the projecting piece 82b is bent in radial outward direction. The coned disc spring 68 is so installed that its outer peripheral edge is made contact with the inside surface of the clutch cover 4 from the side opposite to the diaphragm spring 5 and its inner peripheral edge is made contact with a corner formed by bending the tip end 83c of the projecting piece 82b from the diaphragm spring 5 side.

Also in this structure, when the inner peripheral part of the diaphragm spring 5 is moved to the pressure plate 3 under the clutch engaged condition; the inner peripheral edge of the coned disc spring 68 moves together with the projecting piece 82b in the axial direction toward the pressure plate 3 side and the coned disc spring 68 is compressed in the axial direction around its outer peripheral edge, so that the coned disc spring 68 urges the diaphragm spring 5 in the direction opposite to the pressure plate 3 in the same way as the embodiment of FIG. 15. Accordingly, the trouble due to excessive pressing force generated during clutch operation can be eliminated practically.

INDUSTRIAL APPLICABILITY

As described above, this invention can be utilized effectively form a pull type clutch cover assembly in order to avoid an excessive increase in a load of a diaphragm spring during operation of clutch.

What is claimed is:

1. In a pull type clutch, in which an outside fulcrum point of a diaphragm spring is supported by a clutch cover, an intermediate fulcrum point is made contact with a fulcrum land of a pressure plate, an inside fulcrum point is carried by a release bearing, and a clutch is disengaged by moving the release bearing toward axial rear side opposite to the pressure plate; a pull type clutch cover assembly, in which a disc-like annular coned disc spring is disposed between the diaphragm spring and one of the clutch cover and pressure plate, in such a manner that an inner peripheral edge of the coned disc spring is moved together with the diaphragm spring toward the pressure plate side in axial direction, when the clutch is engaged, so as to urge the diaphragm spring in an axial direction opposite to the pressure plate.

2. In a pull type clutch, in which an outside fulcrum point of a diaphragm spring is supported by a clutch cover, an intermediate fulcrum point is made contact with a fulcrum land of a pressure plate, an inside fulcrum point is carried by a release bearing, and a clutch is disengaged by moving the release bearing toward axial rear side opposite to the pressure plate; a pull type clutch cover assembly, in which a disc-like annular coned disc spring is disposed between the diaphragm spring and the pressure plate, an outer peripheral edge of the coned disc spring is made contact with and supported by one of the clutch cover and a member integrally provided on the clutch cover at a place nearer to the pressure plate from said outside fulcrum point, and an inner peripheral edge of said coned disc is made contact with a portion radially outer than said intermediate fulcrum point of the diaphragm spring from the pressure plate side.

3. A pull type clutch cover assembly as set forth in claim 2, in which projections projecting in radial inward direction are provided on plural places of an inside surface of the clutch cover with spaces left therebetween in circumferential direction, notches fitting onto said projections from outside are made on the outer peripheral edge of the coned disc spring, and the outer peripheral edge is held in such a way that said notches are fitted onto said projections from outside.

4. A pull type clutch cover assembly as set forth in claim 2, in which projections projecting in radial inward direction are provided on plural places of an inside surface of the clutch cover with spaces left therebetween in circumferential direction, concave parts recesses toward the pressure plate side in axial direction are formed by said projections, projecting pieces fitting in the concave parts of said projections are provided on the outer peripheral edge of the coned disc spring, and the outer peripheral edge of the coned disc spring is held in such a way that said projecting pieces are fitted in the concave parts of said projections.

5. A pull type clutch cover assembly as set forth in claim 3, in which said projections are formed by punching from the clutch cover and bending inwardly.

6. A pull type clutch cover assembly as set forth in claim 3, in which said projections are formed in such a way that plural members are secured to an outside surface of the clutch cover with spaces left therebetween in circumferential direction, and parts of the members are passed through holes made on the clutch cover so as to project in radial inward direction.

7. A pull type clutch cover assembly as set forth in claim 4, in which said projections are formed by drawing the clutch cover toward its inside.

8. In a pull type clutch, in which a diaphragm spring having enlarged openings at radial outside ends of radial slits, an outside fulcrum point of the diaphragm spring is supported by a clutch cover, an intermediate fulcrum point is made contact with a fulcrum land of a pressure plate, an inside fulcrum y moving the release bearing toward axial rear side opposite to the pressure plate; a pull type clutch cover assembly, in which grooves are provided on plural places of the fulcrum land with spaces left therebetween in circumferential direction, a disc-like annular coned disc spring is disposed between the diaphragm spring and the pressure plate, a second projecting piece provided on a tip end of a radial outward first projecting piece formed on on an outer periphery of the coned disc spring is fitted in said groove to cause the first projecting piece to contact with the fulcrum land from the diaphragm spring side, a third projecting piece which is provided on a side edge on a clutch rotating direction side of the first projecting piece and projects to the diaphragm spring side, and at tip end of which is bent in the clutch rotating direction, is passed through said enlarged opening with a clearance left on the clutch rotating direction side, and an inner peripheral edge of the coned disc spring is made contact with the diaphragm spring when the clutch is engaged.

9. In a pull clutch, in which a diaphragm spring having enlarged openings at radial outside ends of radial slits, an outside fulcrum point of the diaphragm spring is supported by a clutch cover, an intermediate fulcrum point is made contact with a fulcrum land of a pressure plate, an inside fulcrum point is carried by a release bearing, and a clutch is disengaged by moving the release bearing toward axial rear side opposite to the pressure plate; a pull type clutch cover assembly, in which a disc-like annular coned disc spring is disposed between the diaphragm spring and the pressure plate, an outer peripheral edge of the coned disc spring is made contact with an inside surface of the clutch cover from a side opposite to the diaphragm spring, and its inner peripheral edge is moved integrally with the diaphragm spring to the pressure plate side in axial direction when the clutch is engaged.

10. A pull type clutch cover assembly as set forth in claim 9, in which the inner peripheral edge of the coned disc spring is bent to the diaphragm spring side and passed through the enlarged opening of the diaphragm spring, and tip end of said coned disc is bent outwardly and is made contact with a radial outer peripheral edge of the enlarged opening from the pressure plate side when the clutch is engaged.

11. A pull type clutch cover assembly as set forth in claim 9, in which a disc-like annular body, on which plural projecting pieces projecting through the enlarged openings are formed, is provided on a ring-shaped body disposed between the diaphragm spring and the pressure plate, said projecting pieces being bent outwardly at a tip end of said projecting pieces, the inner peripheral edge of the coned disc spring is made contact with corners formed by vending the tip ends of the projecting pieces from the diaphragm spring side, and the ring-shaped body is made contact with the radial outer peripheral edges of the enlarged openings from the pressure plate side when the clutch is engaged.

* * * * *